(12) United States Patent
Zheng

(10) Patent No.: US 9,783,932 B2
(45) Date of Patent: Oct. 10, 2017

(54) POLYETHYLENE AND POLYPROPYLENE BASED TIE RESIN FOR CO-EXTRUSION

(71) Applicant: EVERGREEN PACKAGING, INC., Memphis, TN (US)

(72) Inventor: Yong Zheng, Cary, NC (US)

(73) Assignee: EVERGREEN PACKAGING, INC., Memphis, TN (US)

( * ) Notice: Subject to any disclaimer, the term of this patent is extended or adjusted under 35 U.S.C. 154(b) by 0 days.

(21) Appl. No.: 14/933,162

(22) Filed: Nov. 5, 2015

(65) Prior Publication Data

US 2016/0230340 A1  Aug. 11, 2016

Related U.S. Application Data

(62) Division of application No. 14/146,416, filed on Jan. 2, 2014, now abandoned.

(51) Int. Cl.
| | |
|---|---|
| *D21H 19/22* | (2006.01) |
| *C08L 23/06* | (2006.01) |
| *C08L 23/12* | (2006.01) |
| *C08F 255/02* | (2006.01) |
| *C08L 51/06* | (2006.01) |
| *B32B 27/08* | (2006.01) |
| *B32B 27/20* | (2006.01) |
| *B32B 27/32* | (2006.01) |
| *C09J 123/06* | (2006.01) |
| *D21H 27/22* | (2006.01) |

(52) U.S. Cl.
CPC ............. *D21H 19/22* (2013.01); *B32B 27/08* (2013.01); *B32B 27/20* (2013.01); *B32B 27/32* (2013.01); *C08F 255/02* (2013.01); *C08L 23/06* (2013.01); *C08L 23/12* (2013.01); *C08L 51/06* (2013.01); *C09J 123/06* (2013.01); *D21H 27/22* (2013.01); *B32B 2250/24* (2013.01); *B32B 2270/00* (2013.01); *B32B 2307/54* (2013.01); *C08L 2205/02* (2013.01)

(58) Field of Classification Search
CPC ......... C08G 63/91; C08L 37/00; C08L 51/06; C08L 2203/16; C08L 2205/02; C08L 23/06; C08L 23/12; C08L 2205/025; C08L 2205/03; D21H 7/22; D21H 19/22; B32B 27/32; B32B 27/20; B32B 27/08; B32B 2307/54; B32B 2270/00; B32B 2250/24

See application file for complete search history.

(56) References Cited

U.S. PATENT DOCUMENTS

| | | | |
|---|---|---|---|
| 4,605,576 A * | 8/1986 | Jabarin ................. | B32B 27/32 428/218 |
| 4,957,968 A | 9/1990 | Adur et al. | |
| 5,336,721 A | 8/1994 | Kiang | |
| 5,637,410 A | 6/1997 | Bonner et al. | |
| 6,475,633 B1 | 11/2002 | Robert | |
| 6,582,808 B2 | 6/2003 | Castle et al. | |
| 6,805,927 B2 | 10/2004 | Dey et al. | |
| 7,935,401 B2 | 5/2011 | Opuszko et al. | |
| 8,007,919 B2 | 8/2011 | Chauveau et al. | |
| 8,119,235 B1 | 2/2012 | Vogel et al. | |
| 8,148,466 B2 | 4/2012 | Wood et al. | |
| 8,197,947 B2 | 6/2012 | Botross et al. | |
| 8,236,886 B2 | 8/2012 | Lee et al. | |
| 8,377,562 B2 * | 2/2013 | Botros ................. | B32B 27/00 428/500 |
| 2008/0013672 A | 2/1999 | Sang et al. | |
| 2007/0141366 A1* | 6/2007 | Rivett et al. ............ | B32B 27/32 428/457 |
| 2008/0131638 A1 | 6/2008 | Hutton et al. | |
| 2013/0004760 A1 | 1/2013 | Pellingra | |

FOREIGN PATENT DOCUMENTS

| | | |
|---|---|---|
| WO | WO9961245 | 2/1999 |
| WO | WO2015103108 | 7/2015 |

OTHER PUBLICATIONS

PCT International Search Report and Writeen Opinion of The International Searching Authority or the Declaration; dated Mar. 20, 2015.

* cited by examiner

*Primary Examiner* — Nathan M Nutter
(74) *Attorney, Agent, or Firm* — J. Bennett Mullinax, LLC

(57) ABSTRACT

A tie resin is provided that is an extrudable blend of anhydride modified polypropylene and anhydride modified polyethylene suitable for use as a tie resin in coextrusions of polypropylene, polyethylene, nylon and EVOH materials.

19 Claims, 2 Drawing Sheets

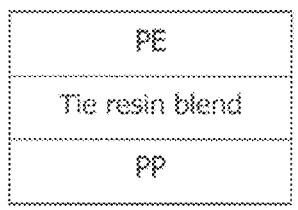
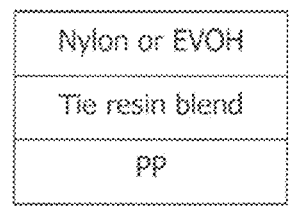
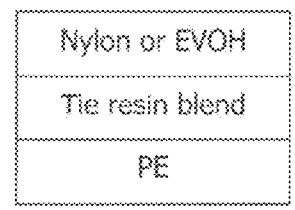
FIGURE 1A  FIGURE 1B  FIGURE 1C
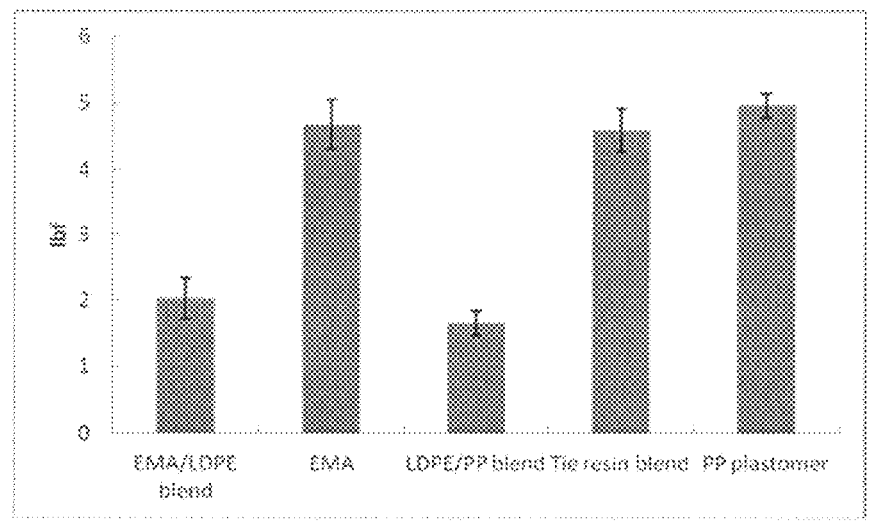
FIGURE 2

POLYETHYLENE AND POLYPROPYLENE BASED TIE RESIN FOR CO-EXTRUSION

RELATED APPLICATIONS

This application is a divisional of U.S. application Ser. No. 14/146,416 filed on Jan. 2, 2014 and which is incorporated herein by reference.

FIELD OF THE INVENTION

The present invention relates to extrudable blends or compounds of anhydride modified polypropylene and polyethylene and to their applications as a tie resin in coextrusion of polypropylene and polyethylene plastics.

The improvement in the ability to coextrude polyethylene (PE) and polypropylene (PP) resins provides improved performance and lower material costs for packaging, construction, automobile and consumer goods products.

BACKGROUND OF THE INVENTION

PE and PP are immiscible polymers. Without proper compatibilizers or tie resins, coextrusion of these materials can lead to separation of the two base polymers. Heretofore, measures to improve the bonding between the polymers include: using PP and PE blends in place of pure PP or PE; using PE and ethylene acrylate copolymer blends in place of pure PE; or using various tie resins which are compatible with both PE and PP during coextrusion.

Using a blend of PE and PP can improve their compatibility to some degree. However, it is difficult to achieve a good balance between improving bonding and retaining desired properties. Blending PE with PP affects the end blended product's optical, mechanical and barrier properties.

A blend of PE with ethylene methacrylate (EMA) can improve its adhesion to PP. Nonetheless, a large percentage of EMA is required to achieve a good adhesion. It inevitably increases material cost and affects the properties of PE. It has also been observed that at a high percentage of ethylene methacrylate copolymer, the blend adheres not only to PP, but also to the equipment. This can lead to frequent disruptions to the production and an increase in downtime. The same problem exists when using ethylene methacrylate copolymer as an individual tie layer between PP and PE.

Polypropylene based POP (Polyolefin Plastomer) and POE (Polyolefin Elastomer) using metallocene techniques can produce copolymers with excellent compatibilities to both PE and PP, and thus are effective tie resins for the two. Nonetheless, POP and POE typically have lower crystallization temperatures than PP and PE. It has been observed that this difference in crystallization temperature can cause wrinkles in multilayer films during sealing.

Kiang (U.S. Pat. No. 5,336,721) discloses an adhesive consisting of an ethylene alkyl acrylate copolymer and a polypropylene and ethylene copolymer grafted with carboxylic acid or anhydride. The percentage of the latter is between 3 to 10 percent. The main purpose of this adhesive blend is for the adhesion between PMP and EVOH.

Adur (U.S. Pat. No. 4,957,968) discloses an adhesive consisting of a polyolefin modified with functional groups, including anhydride and capable of binding metals, an unmodified polyolefin and a partially cured elastomer. The percentage of the modified polyolefin is in the range between 15 to 40 percent. The main purpose of this adhesive is to promote adhesion between polymer and metals.

Lee (U.S. Pat. No. 8,236,886) discloses an adhesive composition comprising a polymer grafted with carboxylic acids or anhydrides, a paraffinic liquid hydrocarbon and a polyolefin base resin of homopolymer, copolymer or mixtures thereof. However, there remains room for improvement and variation within the art.

SUMMARY OF THE INVENTION

It is one aspect of at least one of the present embodiments to provide a tie resin comprising a blend of at least one polyethylene based tie resin and at least one polypropylene based tie resin.

It is a further aspect of at least one embodiment of the invention to provide a coextrusion structure comprising: a layer of polyethylene; a layer of polypropylene; and a tie resin bonding the polyethylene layer to the polypropylene layer, the tie resin comprising a blend of a polyethylene based tie resin and a polypropylene based tie resin. Optionally, the polyethylene can be selected from the group comprising of ultrahigh molecular weight polyethylene, high molecular weight polyethylene, high density polyethylene, medium density polyethylene, linear low density polyethylene, low density polyethylene, very low density polyethylene, and blends thereof. The polypropylene can be selected from the group consisting of polypropylene homopolymer, random ethylene-propylene copolymer and impact ethylene-propylene copolymer, among others and blends thereof.

It is a further aspect of at least one object of the invention to provide a polyethylene based tie resin which comprises a polyethylene modified by grafting with ethylenically unsaturated carboxylic anhydrides. The ethylenically unsaturated carboxylic anhydrides may be selected from the group consisting of maleic anhydride, Nadic anhydride, Himic anhydride, tetrahydrophthalic anhydride, methyl nadic anhydride, methyl Himid anhydride, and combinations thereof.

It is a further aspect of at least one object of the invention to provide a polypropylene based tie resin which comprises at least a polypropylene modified by grafting with ethylenically unsaturated carboxylic anhydrides. The ethylenically unsaturated carboxylic anhydrides are selected from the group consisting of maleic anhydride, Nadic anhydride, Himic anhydride, tetrahydrophthalic anhydride, methyl nadic anhydride, methyl Himid anhydride, and combinations thereof.

It is a further aspect of at least one object of the invention to provide a tie resin blend wherein the concentration of polyethylene based tie resin is between 10 to 90%, and the concentration of polypropylene based tie resin is between 10 to 90%.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 1A-1C sets forth representative structures of a tie resin blend produced by a co-extrusion process.

FIG. 2 is a graph showing various control and tie layers setting forth bonding strength between the polypropylene and the polyethylene layers.

DESCRIPTION OF THE PREFERRED EMBODIMENT

Figure 3:
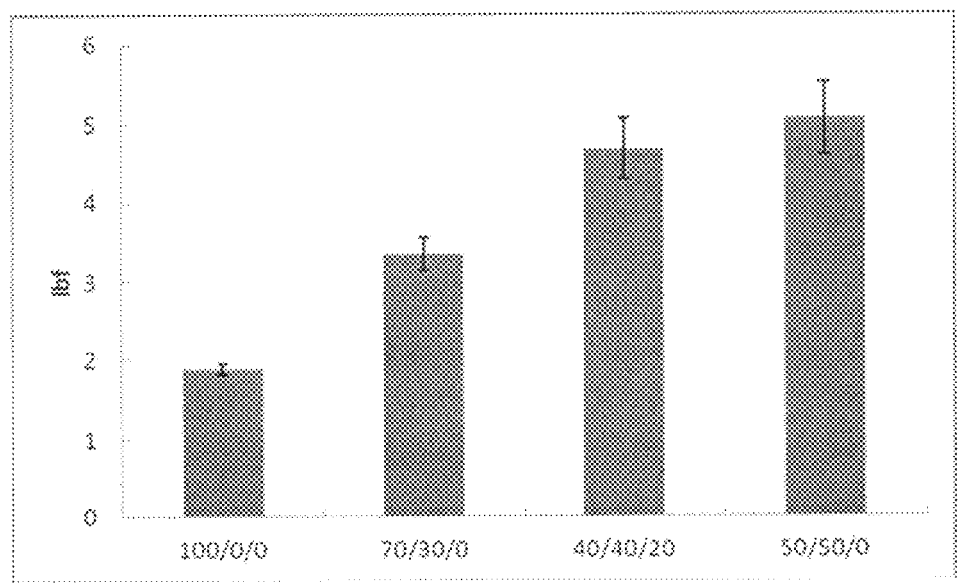
FIG. 3 is a graph setting forth additional bond strength test results from various tie resin blends made in accordance with the present invention.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

This invention relates to a tie resin blend or compound comprising 10 to 90% polyethylene based tie resin, 10 to 90% polypropylene based tie resin and 0 to 80% other polyolefin resins. The preferred applications of this invention are coatings and films produced by coextrusion of PP and PE. Further applications include coextrusion of PE, PP, Nylon and EVOH. Exemplary configurations of this invention are shown in FIGS. 1A-1C.

In this invention, polyethylene based tie resin comprises polyethylenes modified by grafting of ethylenically unsaturated carboxylic anhydrides, including maleic anhydride, Nadic anhydride, Himic anhydride, tetrahydrophthalic anhydride, methyl nadic anhydride, and methyl Himid anhydride, among others, and other components including unmodified polyethylenes or other polyolefins, fillers, lubricants, stabilizers, and other processing aids. The polyethylene base resin before grafting includes but not limited to linear low density polyethylene (LLDPE), low density polyethylene (LDPE), high density polyethylene (HDPE). Examples of commercialized tie resins within this category include brands of Plexar, Amplify GR, Bynel and Admer.

Polypropylene based tie resin comprises polypropylenes modified by grafting of ethylenically unsaturated carboxylic anhydrides, including but not limited to maleic anhydride, Nadic anhydride, Himic anhydride, tetrahydrophthalic anhydride, methyl nadic anhydride, methyl Himid anhydride, and among others, and other components including unmodified polypropylenes or other polyolefins, fillers, lubricants, stabilizers, and other processing aids. The polypropylene base resin before grafting includes but not limited to polypropylene homopolymer, random polypropylene copolymer and impact polypropylene copolymer. Examples of commercialized tie resin fall into this category including Plexar, Bynel and Admer.

The polyolefin resin can be polyethylene homopolymers or copolymers, polypropylene homopolymers or copolymers, ethylene and propylene copolymers, polybutene homopolymers or copolymers, α-polyolefins, and blend thereof.

The grafting modification of polyethylene and polypropylene can be accomplished by thermal or mechanical methods. Preferably, the grafted products are prepared according to U.S. Pat. No. 4,927,888 and U.S. Pat. No. 4,762,890 which are incorporated herein by reference. Namely, the grafting is accomplished in melt at the presence of polyethylene or polypropylene, a free radical initiator or catalyst, and anhydride molecules. The preferred equipment for this process is twin or single extruders.

The grafted anhydride concentration for the resin components is preferably between 0 to 2% by weight. The preferred range is between 0.3 to 1.5% by weight.

The polyethylene based tie resin has melt flow index between 0.4 to 10 g/10 min. The preferred range is between 2.0 and 6.0 g/10 min and has density of between 0.90 to 0.96 g/cm$^3$. The preferred density range is between 0.91 to 0.93 g/cm$^3$.

The polypropylene based tie resin has melt flow Rate between 2 to 470 g/10 min. The preferred range is between 2.0 to 32 g/10 min. A preferred density range is between 0.88 and 0.90 g/cm$^3$.

If the tie resin blend is prepared by dry mixing of the resins pellets, it is preferred that the extruder for any application should have sufficient mixing capacity. The material of this invention can also be prepared by compounding using single or twin screw extruders with sufficient mixing capacity.

Example-1

Film coatings consisting of PP, tie and LDPE were coextruded onto a 17 pt. paper board substrate. Five different ties were compared, including 50:50 blend of an anhydride modified PE tie resin and an anhydride modified PP tie resin, a LDPE and EMA blend, individual EMA, a LDPE and PP blend and a PP based plastomer. The finished structures are shown as follows:

Board/14#PP/3# (50% PE tie+50% PP tie)/10# LDPE
Board/14#PP/13# (30% EMA+70% LDPE) blend
Board/14#PP/3# EMA/10#LDPE
Board/14#PP/3# (50% LDPE+50% PP)/10# LDPE
Board/14#PP/3# PP plastomer/10# LDPE Stripe samples (1" wide) were cut from each coated board for adhesion strength testing. They were heat, sealed with another strip (1" wide) coated with only LDPE. The sealing was conducted at 60 psi and 150° C. with duration of 30 seconds on a heat sealer. After sealing, the sealed samples were cooled down to the room temperature.

To measure the adhesion strength, two unbonded ends of each sealed pair were bent perpendicular to the rest of the board and clamped in the test grip of a tensile testing apparatus. The overhead speed was set at 10 inch/minute. The forces at the failure of the samples were reported. The types of the failure were also checked. For each condition, five samples were prepared and measured. The results are shown in FIG. 2.

The structural failures for the EMA/LDPE blend and LDPE/PP blend were at the interface between the PP and the PE. The failures for the EMA, PP plastomer and tie resin blend took place in the paper board, or "fiber tearing". It is important to note that using the tie resin of this invention in PP and PE co-extrusion led to similar result as conventional EMA and PP plastomer.

Example-2

Extrusion coating was conducted in the same manner as Example-1. Four tie blends of varying concentrations of an anhydride modified PE tie resin, an anhydride modified PP tie resin and LDPE were compared in PP and PE coextrusion. The finished structures were,
Board/14#PP/3# (100% PE based tie)/10#LDPE
Board/14#PP/3# (70% PE based tie+30% PP based tie)/10# LDPE
Board/14#PP/3# (40% PE based tie+40% PP based tie+20% LDPE)/10# LDPE
Board/14#PP/3# (50% PE tie+50% PP tie)/10# LDPE
The sealing and subsequent adhesion strength measurements were also carried out as Example-1. The results are shown in FIG. 3.
The failures for 100/0/0 and 70/30/0 occurred mainly at the interface between PP and PE. The failures for 40/40/20 and 50/50/0 took place in the paper board, an indication of strong bonding between PP and PE layers Example-3

Figure 4:
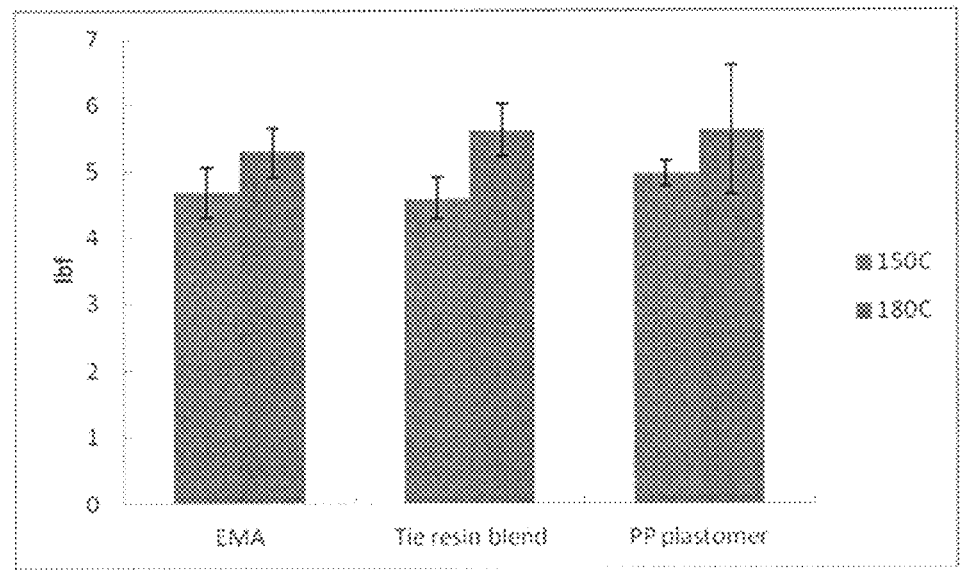
FIG. 4 is a graph setting forth bond strength between extrusion coating layers illustrating differences of bond strength at different sealing temperatures.

Extrusion coating was conducted in the same manner as Example-1. The adhesion strengths of three types of tie resins were compared at two different sealing temperatures, 150° C. and 180° C. The compared structures were,
Board/14#PP/3# EMA/10#LDPE
Board/14#PP/3# (50% PE tie+50% PP tie)/10# LDPE
Board/14#PP/3# PP plastomer/10# LDPE
The sealing and subsequent adhesion strength measurements were also carried out as Example-1. The results are shown in FIG. 4.
For all the samples, the failures occurred in the paper board. The increase in the bond strength at 180° C. is probably due to the fact that more polymer penetrated into the paperboard at the higher temperature, and hence increased the bonding site between the film and the paper.

Example-4

Extrusion coating was conducted in the same manner as Example-1. A 50:50 blend of an anhydride modified PE tie resin and an anhydride modified PP tie resin was coextruded with PP, nylon and PE having a structure of Board/14#PP/2# (50% PE tie+50% PP tie)/5# Nylon-6/2# (50% PE tie+50% PP tie)//10# LDPE
Very good interlayer adhesion was achieved. The similar result was also obtained by replacing nylon-6 with EVOH in the structure.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

What is claimed:

1. A paperboard substrate comprising:
a paperboard;
a layer of polypropylene extruded directly to a surface of the paperboard;
a tie layer applied to the extruded polypropylene layer, the tie layer consisting of a blend of a polyethylene based tie resin and a polypropylene based tie resin; and,
a polyethylene layer extruded to the tie layer.

2. The paperboard substrate according to claim 1, wherein the polyethylene based tie resin comprises at least a polyethylene modified by grafting with ethylenically unsaturated carboxylic anhydrides.

3. The paperboard substrate according to claim 2, wherein the tie resin comprises an ethylenically unsaturated carboxylic anhydrides selected from the group consisting of maleic anhydride, Nadic anhydride, Himic anhydride, tetrahydrophthalic anhydride, methyl nadic anhydride, methyl Himic anhydride, and combinations thereof.

4. The paperboard substrate according to claim 1, wherein the polypropylene based tie resin comprises at least a polypropylene modified by grafting with ethylenically unsaturated carboxylic anhydrides.

5. The paperboard substrate according to claim 4, wherein said ethylenically unsaturated carboxylic anhydrides are selected from the group consisting of maleic anhydride, Nadic anhydride, Himic anhydride, tetrahydrophthalic anhydride, methyl nadic anhydride, methyl Himic anhydride, and combinations thereof.

6. The paperboard substrate according to claim 1, wherein the concentration of polyethylene in the tie resin is between 10 to 90% by weight.

7. The paperboard substrate according to claim 1, wherein the concentration of polypropylene in the tie resin is between 10 to 90% by weight.

8. The paperboard substrate according to claim 2, wherein the polyethylene based tie resin's anhydride concentration is between 0.3 to 1.5% by weight.

9. The paperboard substrate according to claim 4, wherein the polypropylene based tie resin's anhydride concentration is between 0.3 to 1.5% by weight.

10. The paperboard substrate according to claim 2, wherein the polyethylene compound of the tie resin has a melt flow index of between 0.4 to 10 g/10 min.

11. The paperboard substrate according to claim 4, wherein the polypropylene component of the tie resin has a melt flow rate of between 2.0 to 32 g/10 min.

12. The paperboard substrate according to claim 2, wherein a density of the polyethylene component of the tie resin is between 0.90 to 0.96 g/cm$^3$.

13. The paperboard substrate as defined in claim 4, wherein the polypropylene component of the tie resin has a density of between 0.88 and 0.90 g/cm$^3$.

14. A paperboard substrate consisting of:
a paperboard layer having a layer of polypropylene extruded directly to the paperboard;
a tie layer blend consisting of a polyethylene based tie resin and a polypropylene based tie resin, the tie layer applied to the layer of polypropylene; and,
a polyethylene layer extruded to the tie layer.

15. The paperboard substrate according to claim 14, wherein the polyethylene based tie resin comprises at least a polyethylene modified by grafting with ethylenically unsaturated carboxylic anhydrides.

16. The paperboard substrate according to claim 15, wherein the tie resin comprises an ethylenically unsaturated carboxylic anhydrides which are selected from the group consisting of maleic anhydride, Nadic anhydride, Himic anhydride, tetrahydrophthalic anhydride, methyl nadic anhydride, methyl Himic anhydride, and combinations thereof.

17. The paperboard substrate according to claim 14, wherein the polypropylene based tie resin comprises at least a polypropylene modified by grafting with ethylenically unsaturated carboxylic anhydrides.

18. The paperboard substrate according to claim 17, wherein said ethylenically unsaturated carboxylic anhydrides are selected from the group consisting of maleic anhydride, Nadic anhydride, Himic anhydride, tetrahydrophthalic anhydride, methyl nadic anhydride, methyl Himic anhydride, and combinations thereof.

19. A paperboard substrate comprising:
a paperboard;
a layer of polypropylene bonded directly to a surface of the paperboard;
a tie layer applied to the bonded polypropylene layer, the tie layer consisting of a blend of a polyethylene based tie resin and a polypropylene based tie resin; and,
a polyethylene layer bonded to the tie layer.

* * * * *